Nov. 6, 1956
W. H. GILLE
2,769,950
AUTOMATIC PILOTS
Filed April 12, 1952
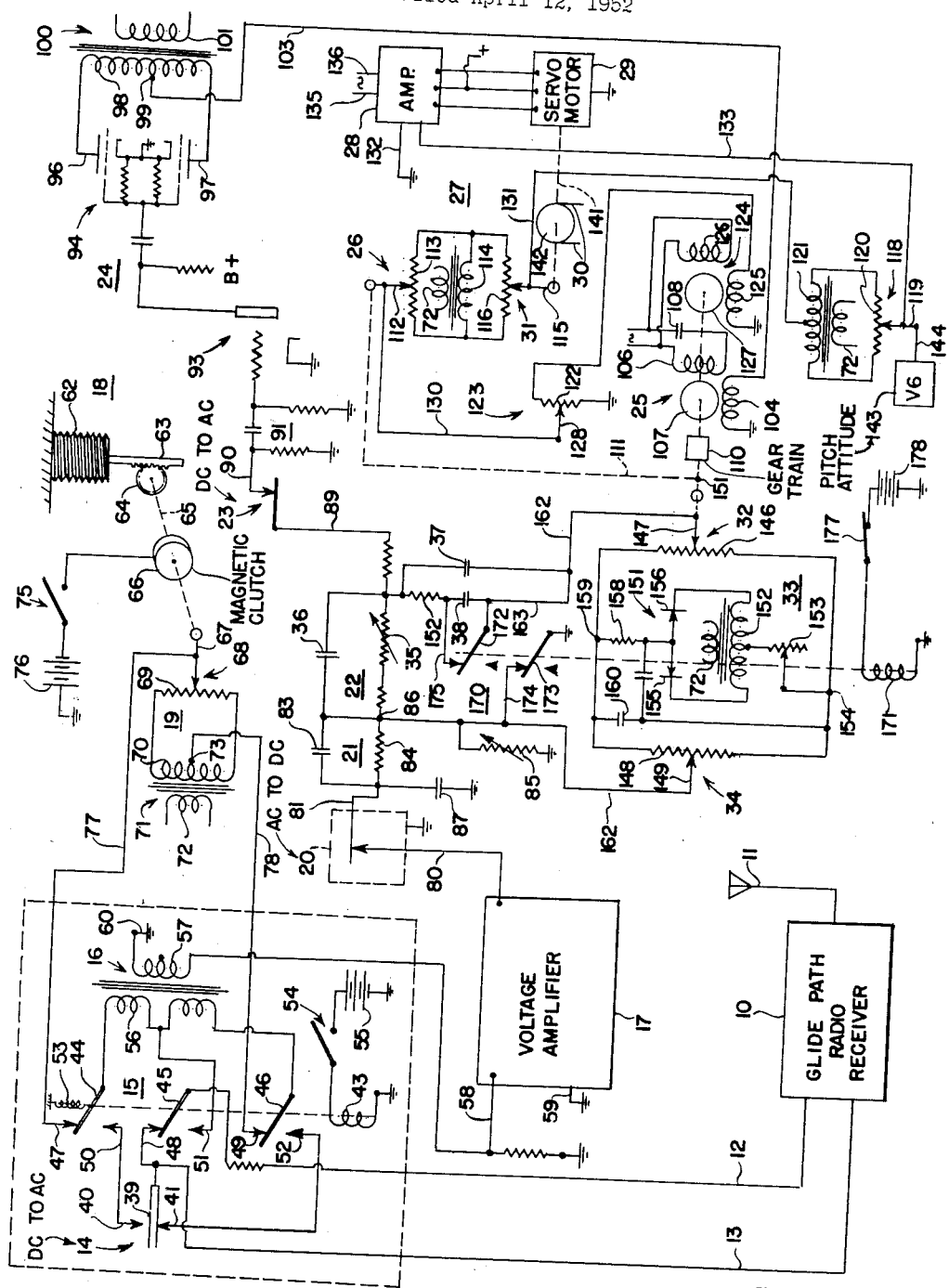
INVENTOR.
WILLIS H. GILLE
BY
George H Fisher
ATTORNEY Patented Nov. 6, 1956

2,769,950

AUTOMATIC PILOTS

Willis H. Gille, St. Paul, Minn., assignor to Minneapolis-Honeywell Regulator Company, Minneapolis, Minn., a corporation of Delaware Application April 12, 1952, Serial No. 281,964

6 Claims. (Cl. 318—489)

This invention relates to flight control apparatus for an aircraft and particularly to apparatus of the type that controls the attitude of the aircraft by automatic operation of the elevator control surface of the craft. Such apparatus is commonly termed an automatic pilot since the control surface has its operation controlled automatically in response to a condition of flight to be maintained.

It is an object of this invention to provide improved apparatus for controlling the attitude of an aircraft about its lateral axis.

Another object of this invention is to provide an improved automatic control apparatus for regulating the operation of an elevator control surface in such manner that a desired position of the craft is maintained.

Another object of this invention is to provide an improved automatic control apparatus for regulating the operation of an elevator control surface in such manner that a desired position of the craft is maintained despite a continuing disturbance tending to change said position.

It is a further object of this invention to provide an improved apparatus for operating an elevator control surface and to provide control thereof from an altimeter to maintain constant altitude or from a radio instrument landing receiver to control the glide path of the craft during "blind" landing.

A further object of this invention is to provide improved apparatus and components constituting the same which embody novel features adapted for realizing the above stated objects but also adapted for application to other uses.

In accordance with the principles of the invention, electrical voltage control signals in accordance with the craft's change or displacement in altitude or in accordance with the position of the craft relative to a glide path beam of a radio instrument landing system are applied to a novel electrical network which derives a rate of change component of said signal which is combined with the displacement component. The combined signal controls a motor which supplies a further control signal. This further control signal operates through the automatic pilot on the control surface to restore the craft to a desired position in altitude, or relative to the glide path. The motor also positions a slider of a potentiometer arranged in parallel with a second potentiometer in a direct current Wheatstone bridge.

The bridge is energized from rectified alternating current and the output of the bridge is applied across a resistor. The voltage drop across this resistor limits the operation of the motor proportional to the combined rate and displacement voltage signal. Suitable filtering means permit any residual alternating signal components from the bridge to by-pass the resistor. Additionally, rate providing means are arranged in the network to offset lag in the derivation of a voltage drop across the resistor due to the operation of the filter which voltage determines duration of motor operation. The network additionally includes further filtering arrangements which pass transient or changing control voltages from the Wheatstone bridge but block the passage of steady state voltage from said bridge across said resistor so that in the presence of a steady state displacement of the craft from a selected altitude or glide path beam further operation of the motor will result. This motor operation in turn giving sufficient additional elevator operation to restore said craft to the desired position in altitude or relative to the beam. As a result the motor follows closely the position of the craft relative to the condition to be maintained so that changes therefrom result in immediate elevator operation to restore the original conditions.

Further objects and advantages of the invention will become apparent, hereinafter, from the following specification taken in conjunction with the accompanying drawing, disclosing a preferred embodiment thereof, wherein:

The sole figure is a schematic arrangement of an embodiment for maintaining an aircraft at constant altitude or maintaining the position of said craft in a radio beam defined glide path.

Referring to the drawing, and for a general understanding of the apparatus, a glide path receiver in response to signals being emitted from a ground station conventionally provides a direct voltage output proportional to the distance of the aircraft from a glide path beam. This direct voltage is applied to a converter 14 for changing the direct voltage to an alternating voltage. This alternating voltage is then applied through the in contacts of a relay 15 to a primary winding 56 of a transformer 16. The secondary winding 57 of transformer 16 is connected to the control electrodes of a voltage amplifier 17.

Alternatively, an altitude controller 18 operates a slider 19 in proportion to the departure of the craft from a selected altitude and through the out contacts of relay 15 applies an alternating voltage proportional to this change in altitude to the primary winding 56 of the transformer 16. By means of the secondary winding 57 of transformer 16, the alternating voltage proportional to change in altitude is applied to the voltage amplifier 17. Alternating voltages from the output of amplifier 17 are applied to a converter 20 whereby they are rectified or changed to direct voltages. The direct voltage output from the converter 20 is applied to a derivative network 21 having an output consisting of a voltage proportional to the displacement and rate of displacement of the output voltage from converter 20. This output voltage of network 21 is applied through a network 22 to a third voltage converter 23 which changes the direct voltage having rates and displacement components to an alternating voltage. The alternating voltage output from converter 23 is applied to a discriminator amplifier 24.

The output from the amplifier 24 is applied to the amplifier winding of a capacitor type induction motor 25. The motor 25 in turn operates a potentiometer 26 in a balanceable network 27 that controls flight control apparatus. The operation of the potentiometer 26 unbalances the network 27 and effects operation of the elevator servomotor amplifier 28. The elevator servomotor amplifier 28 in turn controls the elevator servomotor 29. Motor 29 operates by control cables 30 the elevator surface (not shown) of the craft and simultaneously operates a rebalancing potentiometer 31 to rebalance network 27.

To limit the extent of operation of motor 25 in proportion to the signal applied to the discriminator amplifier 24, the motor 25 also operates a potentiometer 32 in a direct current bridge 33. The bridge 33 includes a centering potentiometer 34. The voltage across the potentiometers 32 and 34 is applied across a resistor 35 in network 22 through a large condenser and resistor in series and the resultant voltage drop across the resistor 35 opposes the output voltage from network 21.

A filter condenser 36 is provided across the resistor 35 so that alternating voltage components of the rectified alternating voltage from which the bridge 33 is energized by-pass resistor 35. Since the filter condenser 36 results in a lag in setting up the balancing voltage drop across resistor 35 from the potentiometers 32 and 34, a small capacity condenser 37 is placed in parallel with the series connected condenser and resistor and in series with the rebalancing effecting voltage across potentiometers 32 and 34 to counteract this lag and prevent hunting operation of motor 25.

The large condenser and resistor connected in series are provided in order that the craft return to its original position in the glide path beam upon departure therefrom or to return to a selected altitude upon departure therefrom despite continuous disturbances tending to cause such departures. There is provided thus an additional feed-back path in addition to the parallel condenser for the voltage across potentiometers 32 and 34.

For a more detailed description of the components and their inter-relationship in the embodiment, reference is made to the following amplified description.

The glide path radio receiver 10 is provided with an antenna 11 and conveniently develops across output conductors 12 and 13 a direct voltage proportional to the displacement of the aircraft from the radio beam defined glide path. This type of radio receiver is more fully described in two publications of the Civil Aeronautics Administration said publications being further identified as Technical Development Reports 35 and 55 published in October 1943 and June 1947 respectively.

The converter 14 may be a conventional vibrator having a reed 39 coacting with spaced contacts 40, 41. The reed is connected to conventional actuating means energized from a 400 cycle alternating voltage source whereby it alternately engages the contacts 40, 41 and thus serves to convert a direct voltage to an alternating voltage of 400 cycle frequency. Adjacent the converter 14 and connected thereto is the relay 15 having an operating winding 43 and three operable arms 44, 45, and 46. These arms normally engage respectively with out contacts 47, 48, and 49. When the winding 43 is energized, the arms 44, 45, and 46 respectively engage in contacts 50, 51 and 52. The winding 43 is energized through a single pole single throw switch 54 from a battery 55. Vibrator contact 40 is connected to relay in contact 50; the reed 39 is connected to relay out contact 48; and the vibrator contact 41 is connected to relay in contact 52. Radio receiver output conductors 12 and 13 are respectively connected to the reed 39 of vibrator 14 and relay arm 45. Thus with the relay biasing spring means 53 holding the relay arms in their out position, a circuit including the radio receiver output conductors 12 and 13 by-passes the vibrator 14 and the receiver output is not utilized.

The transformer 16 comprises a center tapped primary winding 56 and a secondary winding 57. One end of winding 56 is connected to relay arm 44 and the opposite end is connected to relay arm 46. The center tap is connected to relay in contact 51. Thus with the relay 15 in the operated condition, the two portions of winding 56 separated by the center tap are alternatively energized from the actuation of the vibratory reed 39 in the vibrator 14 in opposite directions to develop an alternating voltage in the secondary winding 57 of transformer 16.

The voltage amplifier 17 is of the conventional type and includes input conductors 58, 59 respectively connected to the grid and cathode thereof. One end of transformer secondary winding 57 is connected to conductor 58 and the opposite end is connected by a secondary winding ground conductor 60 to the ground conductor 59 of amplifier 17.

The altitude controller 18 comprises an altimeter 62 which may be of the aneroid type and which on change of altitude operates through a rack 63 and pinion 64 a shaft 65. The shaft 65 has its rotation transmitted through a conventional magnetic clutch 66 to a slider 67 of a potentiometer 68. The potentiometer 68 is the adjustable part of an altitude signal generator 19 and includes a resistor 69 which coacts with slider 67. Resistor 69 is connected across a secondary winding 70 of a transformer 71. A primary winding 72 of the transformer 71 is energized from the 400 cycle supply. The secondary winding 70 includes a center tap 73 and alternating voltage signals proportional to the change in altitude of the craft are derived between the slider 67 and center tap 73 during energization of clutch 66. The magnetic clutch 66 conventionally includes a winding whose energization is controlled through a single pole single throw switch 75 from a battery 76. A conductor 77 connects slider 67 with out contact 47 of relay 15 and a conductor 78 connects the center tap 73 of secondary winding 70 with out contact 49 of the relay. Thus with the relay 15 in the out position, the two halves of the primary winding 56 of transformer 16 are energized in the same direction and a voltage proportional to the change in altitude of the aircraft may be induced in secondary winding 57 of transformer 16 and applied to the voltage amplifier 17.

The output from the voltage amplifier 17 is transmitted by conductor 80 to the converter 20. The converter 20 may be a vibrator similar to the converter 14 and energized from the 400 cycle supply. The direct voltage output from the vibrator 20 is transmitted by conductor 81 to network 21.

Network 21 is of the derivative or rate taking type comprising a resistor 84 connected between conductor 81 and a junction point 86. A condenser 83 is connected across conductor 81 and junction 86 in a shunting relation relative to resistor 84. A variable resistor 85 is connected between junction 86 and ground. A filtering condenser 87 is connected between the junction of conductor 81 and resistor 84 and ground. The direct voltage supplied from the conductor 81 to network 21 has a rate component added thereto by the operation of condenser 83 and resistor 85 so that the composite voltage between junction point 86 and the ground end of resistor 85 is proportional to the magnitude of the voltage applied to network 21 plus the rate of change of such voltage.

This voltage at junction 86 is led through a resistor 35 and conductor 89 to the third voltage converter 23 which may be a vibrator similar to the converter 14. The vibrator 23 is energized from the 400 cycle alternating voltage supply and converts the direct voltage output from network 21 to an alternating voltage output. This alternating voltage output is led by conductor 90 through a resistor-capacitor coupling 91 to the control electrodes of a voltage amplifying section 93 of the discriminator amplifier 24. The amplifier 24 includes a discriminator section 94 which has its control electrodes energized from the voltage output from the voltage amplifier section 93. The discriminator section 94 includes a pair of triode tube elements having plates 96, 97. The plates of the triodes are connected to opposite ends of a secondary winding 98 of a transformer 100. The transformer includes a primary winding 101 energized from the 400 cycle supply. The secondary winding 98 includes a center tap 99 which divides the secondary winding 98. Current in excess of a normal current passes through one or the other half of the secondary winding 98 depending upon the phase relationship of the voltage supplied to the primary winding 101 with respect to the control voltage applied to the control elements of the discriminator section of amplifier 24.

The output from the discriminator section 94 of amplifier 24 is transmitted through conductor 103 to an amplifier winding 104 of the motor 25. The motor 25 is a capacitor-induction type and includes a line winding 106 energized through a phasing condenser 108 from the 400 cycle supply. The motor 25 includes a rotor 107 which may be of the conventional squirrel cage type and rotates in one or the other direction in accordance with the direction of the rotating field provided by the two motor windings 104, 106. Such amplifier-motor combinations wherein a motor is reversibly controlled from an amplifier are well known in the art as illustrated by the patent to Upton 2,423,534.

The rotation of rotor 107 of motor 25 is transmitted through a gear train 110 and motion transmitting means 111 to slider 112 of potentiometer 26 in balanceable network 27.

The balanceable network 27 in addition to potentiometer 26 includes a plurality of voltage signal generators comprising rebalancing potentiometer 31, pitch attitude potentiometer 118, and a rate of change of a condition potentiometer 123. The rate of change of a condition voltage provided from poentiometer 123 depends upon whether the potentiometer 26 in network 27 is being adjusted in accordance with the change in altitude of the aircraft or its displacement from the glide path beam.

Potentiometer 26 includes a slider 112 and a resistor 113. Potentiometer 31 comprises a slider 115 and a resistor 116. Resistors 113 and 116 are connected in parallel across the ends of a secondary winding 114 of the transformer 71. Since a single primary winding in a transformer may serve as a supply for a plurality of secondary windings, a common primary winding is indicated in each of the several potentiometer networks. Potentiometer 118 comprises a slider 119 and a resistor 120 which is connected across the ends of a secondary winding 121 of the transformer. Potentiometer 123 comprises a slider 128 and a resistor 122. The resistor 122 is connected for its energization across the ends of a secondary winding 125 of a velocity signal generator 124. The velocity signal generator 124 includes a primary winding 126 energized from the 400 cycle A. C. supply and a rotor 127 which on rotation inductively associates the secondary winding 125 with the energized primary winding 126. The magnitude of the voltage induced in secondary winding 125 is dependent upon the rotational speed of the rotor 127. The rotor 127 is driven from the motor 25.

The potentiometers 26, 31, 118, and 123 are connected in electrical series relationship by a conductor 130 connecting slider 121 with slider 112 and a conductor 131 connecting slider 115 and a center tap of secondary winding 121. The series connected potentiometers thus define a balanceable network 27 whose output terminals are constituted by a grounded end of resistor 122 and slider 119. The control voltage in network 27 on unbalance thereof is applied to servomotor amplifier 28 by an amplifier connection 132 extending to ground and thus to the lower end of resistor 122 and also a conductor 133 extending from slider 119 to the amplifier 28. In addition to the control voltage being applied to amplifier 28 from network 27 through conductors 132 and 133, the amplifier 28 includes input connections 135, 136 connected to the 400 cycle A. C. supply.

The amplifier 28 reversibly controls the rotation of an elevator servomotor 29. The direction of rotation is dependent upon the phase relationship of the voltage between amplifier control voltage input conductors 132, 133 with respect to the supply voltage across conductors 135, 136. The servomotor amplifier-servomotor combination may be of a type disclosed in Patent 2,466,702 to M. C. Hamby.

The elevator servomotor 29 through its output shaft 141 drives the cable drum 142 from which the elevator control cables 30 extend. The output shaft 141 also positions slider 115 of potentiometer 31. The remaining sliders of the potentiometers in network 27 are also provided with operating means. The slider 112 of potentiometer 26 as stated is positioned by the motor 25 through the operating means 110, 111. Slider 119 is positioned along resistor 120 from a vertical gyroscope 143 through a suitable operating means 144. The vertical gyroscope 143 is of a type well known in the art and displaces slider 119 relative to resistor 118, in accordance with the pitch attitude of the aircraft. Slider 128 of potentiometer 123 is manually adjusted to select a desired proportion of the voltage induced in secondary winding 125 of velocity signal generator 124.

The operation initiating voltage for the discriminator amplifier 24 is derived from the network 21. The rebalancing voltage for amplifier 24 is obtained from the rebalancing bridge 33.

The balanceable bridge 33 comprises potentiometers 32 and 34. Potentiometer 32 comprises a resistor 146 and a slider 147 positioned through an operating means 151 from the gear train 110 driven by motor 25. Poteniometer 34 includes a resistor 148 and a slider 149 which is manually adjusted. Potentiometer resistors 146 and 148 are connected across the output of a full wave alternating voltage rectifier 151. Rectifier 151 is energized from a secondary winding 152 of transformer 71. The center tap of secondary winding 152 constitutes one output terminal of the rectifier 151 and a variable resistor 153 extends therefrom to a terminal 154. A pair of rectifiers 155, 156 which may be selenium rectifiers or other suitable type are connected in opposite relationship and as thus connected in series their remaining ends are connected to the remaining ends of secondary winding 152. A resistor 158 connects the junction of the rectifiers 155, 156 with a terminal 159. The potentiometer resistors 146 and 148 are connected across the terminals 154, 159. A condenser 160 has one end connected to terminal 159 and its other end connected to the junction of rectifiers 155, 156 and the other end is further connected to terminal 154. The relative displacement of sliders 147 and 149 of potentiometers 32 and 34 provide a rebalance voltage for bridge 33.

The output voltage from the bridge 33 is applied across resistor 35 by a conductor 162 extending from slider 34 to one end of resistor 35 and by a series connection comprising conductor 162, conductor 163, a large capacitor 38, and resistor 152 connected to the remaining end of resistor 35. By means of the capacitor 38, a rebalancing voltage is applied across resistor 35 only while slider 147 is being adjusted and thus while the altitude or displacement of the craft from the beam is changing. During steady state departures from altitude or from the glide path beam no rebalancing signal is provided from bridge network 33 across resistor 35. The steady state signal either from altitude potentiometer 68 or radio receiver 10 being unbalanced, further operation of motor 25 occurs. Motor 25 thus additionally displaces slider 112 to cause further unbalance in network 27 to occur. The unbalance of network 27 causes further operation of elevator servomotor 29 and the resultant elevator displacement controls the craft to remove the steady state departure from the desired condition of the craft. Due to the small impedance of the capacitor 38 there is no material phase shift in the voltage across resistor 35 from bridge 33. The large filter capacitor 36 shunts the resistor 35 to remove the unwanted alternating voltage drop across resistor 35.

To obviate the lag in the development of a rebalance voltage across resistor 35 due to the presence of the large filter condenser 36 the small condenser 37 is shunted across the capacitor 38 and resistor 152 to provide a phase shift action to the voltage across resistor 35. Thus the rate component of the voltage across resistor 35 resulting from the inclusion of capacitor 37 offsets the lag in the development of a displacement voltage across resistor 35 due to the presence of condenser 36.

If there be any residual signal in bridge 33 due to relative displacement of sliders 147, 149 upon termination of an operation involving this bridge an arrangement is provided whereby the condenser 38 may be by-passed to permit the application of this residual signal as a reset control voltage to amplifier 24 which thereafter effects the operation of motor 25 to adjust slider 147 until the bridge 33 has no longer any voltage output. This by-passing arrangement includes a reset relay 170 having an operating winding 171 and a pair of gravity actuated arms 172, 173 which respectively coact with in contacts 175, 174. The operating winding 171 is energized through a single pole single throw switch 177 from a battery 178. The operating winding 171 is normally unenergized and is only energized during the reset operation when the switch 177 is closed as shown in the figure. Relay arm 172 is connected to conductor 163, and in contact 175 is connected to the junction of resistor 152 and condenser 38 so that the condenser 38 is by-passing during the resetting operation. Relay arm 173 is connected to ground, and in contact 174 is connected to slider 149 so that the residual voltage in bridge 33 betwen sliders 147, 149 is applied between the control electrodes in the voltage amplifier section of amplifier 24. When constant altitude or glide path control is utilized, the switch 177 is moved to the open position so that the gravity actuated relay arms 172 and 173 are disengaged from their in contacts.

While various component details have been sufficiently disclosed the table below contains the values of the resistances and capacitors associated with networks 21, 22 and bridge 33 which provide a desirable operation of the apparatus.

| | | |
|---|---|---|
| Resistance 85 | meg | 2 |
| Resistance 35 | meg | 2 |
| Resistance 158 | ohms | 100 |
| Capacitor 37 | mfd | .25 |
| Capacitor 38 | mfd | 2.0 |
| Capacitor 83 | mfd | 0.3 |
| Capacitor 36 | mfd | 1.0 |

The operation of the system will be apparent from the above detailed description. In brief, either constant altitude or glide path control may be applied depending upon the operation of switch 54. For altitude control, the switch 54 is in the unoperated position and manual switch 75 is closed to energize the clutch 66 and thus operatively connect the pressure responsive aneroid 62 with the slider 67. It is assumed that the aircraft is at the altitude selected and which is to be maintained. Upon departure of the aircraft from the selected altitude, the aneroid 62 in response thereto operates slider 67 to derive an alternating voltage from the altitude controller 18. This voltage is applied by means of conductor 77 extending from slider 67, out contact 47, relay arm 44, to winding 56, and return through relay arm 46, out contact 49, conductor 78, to the center tap 73 of secondary winding 70. The voltage in primary winding 56 induces a voltage in secondary winding 57, and this voltage in turn is applied across the input electrodes of voltage amplifier 17. The output of this amplifier passes through the alternating voltage to direct voltage converter 20 and thence through conductor 81 to the rate deriving network 21 where a combined displacement and rate voltage is derived across resistor 85. The voltage at terminal 86 at one end of resistor 85 is applied through resistor 35, and lead 89 to the direct voltage to alternating voltage converter 23. The output from converter 23 is applied through coupling 91 to the control amplifier section 93 of amplifier 24 and to the discriminator section 94 thereof. The operation of control amplifier 24 energizes the motor 25 which in turn positions slider 112 of potentiometer 26 to unbalance the automatic pilot control input network 27. The unbalance of the network 27 operates the automatic pilot servomotor amplifier 28 which causes the servomotor 140 to position the elevator control surface and operate follow-up slider 115 to rebalance network 27.

The motor 25 also operates the slider 147 of the rebalance potentiometer 32 in bridge network 33, and as the slider 147 changes its position along resistor 146 a voltage drop appears across resistor 35 which is opposite to the applied voltage at terminal 86.

The operated elevator causes the aircraft to change its attitude and return toward its original altitude. As the initial altitude is approached the aneroid 62 re-adjusts slider 67 so that a smaller input voltage is applied at terminal 86 so that the voltage drop across resistor 35 from rebalancing bridge 33 causes the control amplifier 24 to effect reverse operation of the motor 25. Motor 25 therefore moves slider 112 of potentiometer 26 back toward its original position and causing a reverse unbalance in the amplifier network 27. This reverse unbalance causes the elevator servomotor 140 to move the elevator back toward its original position. This repositioning of slider 147 decreases the rebalancing voltage across resistor 35 which therefore follows the trend of the decreased altitude control signal from potentiometer 68. As the altitude difference continues to decrease under the applied elevator, the signal from the altitude control signal generator 19 continues to decrease. The opposed voltage across resistor 35 from the balancing bridge 33 maintains the opposite unbalance on the amplifier 24 which in turn causes the motor 25 to move slider 147 back toward its original position on resistor 146. The altitude correcting action of the elevator is continuous in that the altitude is continually changing and thus slider 147 is continuously changing its position. When the aircraft has regained its original altitude, the motor 25 will have moved slider 147 back to its original position.

Under some circumstances such as that due to a permanent or continuous acting disturbing force tending to change altitude, rather than a transient disturbance as considered in the first instance, the slider 67 operated by the altimeter does not return to its original position since a slight displacement of the elevator control surface is necessary to prevent further deviation from the original altitude due to the disturbance.

In this situation where the elevator control surface has a steady state displacement and is not moved continuously in the correction of changes of altitude, the slider 147 will momentarily at least reach a fixed position during which it is unoperated. Under these circumstances while there may be a voltage in the bridge 33, the blocking effect of the condenser 38 prevents the now steady state rebalancing voltage from bridge 33 from being applied across resistor 35. The steady state altitude change signal from signal generator 19 therefore is unopposed by a voltage drop across resistor 35 and further operation of the amplifier 24 results. This further operation of the amplifier causes the motor 25 to rotate additionally to develop a change in voltage in the balancing bridge 33 which opposes the voltage from the signal generator 19 applied to resistor 35.

Additionally the movement of motor 25 further adjusts slider 112 of potentiometer 26 so that the elevator control surface is further displaced from its partially operated position. This further displacement of the elevator control surface overcomes the permanent disturbing force of the aircraft and causes it to regain its original altitude. When the original altitude is regained the signal generator 19 is in a null condition but a steady state voltage is derived in the rebalancing bridge 33 which as indicated previously is prevented by the condenser 38 from being applied across the resistor 35. With the slider 147 and therefore the slider 112 of potentiometer 26 off center, a sufficient corrective elevator position is continuously maintained to prevent the permanent disturbing force from causing any change in altitude from the original altitude.

While the overall operation has been described with reference to control from the atlitude controller 18, the operation is similar for control from the radio receiver 10. The arrangement not only provides for return of the aircraft to the radio beam defined glide path upon transient disturbances to the craft but also causes its return upon deviations of the craft from the glide path due to permanent disturbing forces on the craft's attitude. The internal stabilizing effect of the condenser 37 on the operation of amplifier 24 is such that it provides a leading component voltage across resistor 35 which reinforces the displacement voltage across resistor 35 during the time that slider 147 is being displaced from its center position but supplies a voltage component which opposes the displacement component during the time that the slider is moving from its maximum operated position back toward its normal position. This leading effect during movement of slider 147 away from its center position insures that the motor 25 will operate promptly in response to changes in altitude from the selected value whereas the subtracting or detracting effect of the rate signal due to condenser 37 causes the applied signal to amplifier 24 to be less than if derived from the displacement signal alone. By thus reducing the applied signal, the motor 25 has its speed reduced and is thus prevented from overshooting the center point of resistor 146 which during transient disturbances conforms to the desired altitude of the aircraft.

It will now be apparent that there has been provided a novel control apparatus subject either to an altitude controller or a glide path controller which functions to cause said craft to maintain its flight at the desired altitude or glide path position and in which corrections for changes from the desired altitude or position are corrected without hunting of such craft about the desired altitude or position and furthermore, that any permanent disturbing force operating on said craft is overcome by said apparatus to permit said craft to fly at the selected altitude or position relative to the glide path beam.

I claim as my invention:

1. Control apparatus for an aircraft having an elevator control surface, said apparatus comprising: position responsive means for providing a direct voltage signal proportional to change in position of said craft from a desired datum; a variable impedance comprising a potentiometer means having a pair of output terminals; means energizing said potentiometer means from a source of rectified alternating voltage; a first condenser with small capacity having one end connected to one output terminal of said variable impedance; means for connecting a second condenser with large capacity and a first resistor in parallel between the opposite end of said first condenser and the remaining terminal of said variable impedance; a third condenser and second resistor in series connected across the first condenser with the second resistor in a circuit adjacent the first resistor; means for applying said direct voltage due to change in position in series with the voltage drop across said first resistor from said potentiometer means to derive a resultant voltage; motor means responsive to said resultant voltage for adjusting said variable impedance; and means adapted to control said elevator from said motor means.

2. Control apparatus for an aircraft having a control surface for altering the position of the craft about an axis thereof, said apparatus comprising: control means for providing a direct voltage control signal proportional to change in position of said craft from a datum; an adjustable variable impedance means having a pair of voltage output terminals; means connected to the variable impedance for energizing said variable impedance from rectified alternating voltage; a first condenser having one end connected to one variable impedance voltage output terminal; a second condenser and a first resistor connected in parallel between the remaining end of said first condenser and the other variable voltage output impedance terminal; a second resistor and third condenser connected in series and across said first condenser; means connecting the control means to one end of the first resistor for applying said direct voltage to one end of said first resistor; motor means connected to the opposite end of said first resistor whereby the resultant of said direct voltage and the voltage drop across said first resistor from said adjustable impedance means is applied to said motor means; means for adjusting said variable impedance from said motor means; means adapted to control said control surface from said motor means and circuit providing means for selectively shunting said third condenser during absence of the direct voltage control signal whereby the first condenser and second resistor along with the first resistor form a resistor-reactance network across the variable impedance voltage output terminals to effect return of said variable impedance to nonadjusted position.

3. Control apparatus for an aircraft having an elevator control surface, said apparatus comprising: control means responsive to change in craft position for providing a direct voltage proportional to change in position of said craft from datum; resistor-capacitor means connected to the responsive means for supplying a resultant voltage across a first resistor in said resistor-capacitor means said voltage having a component proportional to said change in position and a component proportional to said position change rate; an adjustable variable impedance network having a pair of output terminals and a pair of input terminals; means connected to the input terminals for energizing said variable impedance from a source of rectified alternating voltage; a condenser connected to one output terminal; a second condenser and second resistor connected in parallel across the remaining end of said first condenser and the second output terminal of said network; means for connecting one end of said first resistor to one end of said second resistor; motor means including voltage responsive means having one control terminal connected to the remaining end of said second resistor and a second control terminal connected to the remaining end of said first resistor; means for adjusting said variable impedance from said motor means; and further means positioning said elevator and controlled from said motor means.

4. Control apparatus for an aircraft having a control surface for controlling its position about an axis thereof, said apparatus comprising: position responsive means for deriving a first control signal proportional to change in position of said aircraft from a predetermined datum; a servomotor adapted to control the positioning of said surface; operating means including an amplifier reversibly controlling said servomotor; a variable magnitude direct voltage source having a pair of output terminals and adjusted from said servomotor; a first condenser having a low impedance and a first and second resistor all connected in series in the order stated and the free end of the condenser and second resistor connected to said voltage source output terminals; a second condenser having a high impedance connected across said first condenser and first resistor whereby upon continuous adjustment of said direct voltage source a second control signal having components proportional to the rate of operation of said servomotor is provided across said second resistance; and means for applying both first and second control signals to said amplifier.

5. Control apparatus for an aircraft having an elevator control surface, said apparatus comprising: altimeter means for selectively providing a direct voltage proportional to the change in altitude; a phase shifting network, comprising a pair of series connected resistors and a capacitive reactor parallel to one resistor, electrically connected across said altimeter means and providing a voltage across the other network resistor having a leading component over the applied voltage; a voltage rebalancing bridge providing an output voltage; means energizing said bridge from rectified alternating voltage; a third resistor connected electrically across said bridge and thus energized from said bridge output voltage; a motor means;

means connecting one end of the third resistor to one end of the other network resistor and the other end to said motor means for opposing the voltage drop across said third resistor to said voltage across said other network resistor; a filter condenser connected in parallel with said third resistor; a second condenser in series with said third resistor, to resist over-travel of said motor means beyond the rebalance point of said bridge; means adjusting said bridge from said motor means; selective means for bypassing said second condenser whereby the voltage drop across said third resistor during the absence of an altitude signal may effect return of said bridge to nonadjusted condition by said motor means; and further control signal means operated by said motor means and adapted to operate said elevator surface.

6. Control apparatus for an aircraft having an elevator control surface, said apparatus comprising: altimeter responsive signal means for providing a direct voltage proportional to change in altitude; a variable impedance bridge having a pair of voltage output terminals and a pair of input terminals; means connected to the input terminals for energizing said variable impedance from rectified alternating voltage; means for providing a first and second junction by connecting a first resistor and first condenser in parallel; means for providing a third and fourth junction by connecting a second resistor and second condenser in parallel; means connecting the first junction to one output terminal, the second terminal to the third terminal, and the fourth terminal to the other voltage output terminal; means for connecting the fourth terminal to the altimeter means to place the voltage drop across said second resistor in series with said altitude change signal; motor means connected to the third terminal and responsive to said altitude change voltage and said voltage across said second resistor; follow-up means driven by said motor and adjusting said variable impedance to balance said altitude change voltage with said resistor voltage drop; and means adapted to operate said elevator surface and positioned by said motor means.

References Cited in the file of this patent
UNITED STATES PATENTS

| | | |
|---|---|---|
| 2,423,337 | Moseley | July 1, 1947 |
| 2,429,642 | Newton | Oct. 28, 1947 |
| 2,432,862 | Coulbourn | Dec. 16, 1947 |
| 2,439,198 | Bedford | Apr. 6, 1948 |
| 2,443,748 | Sanders et al. | June 22, 1948 |
| 2,482,064 | Hornfeck | Sept. 13, 1949 |
| 2,507,304 | Hofstadter | May 9, 1950 |
| 2,615,658 | Young | Oct. 28, 1952 |
| 2,632,135 | Carpenter | Mar. 17, 1953 |